United States Patent
Osness et al.

(10) Patent No.: US 11,034,597 B2
(45) Date of Patent: Jun. 15, 2021

(54) COAGULANT BLEND IN SAGD WATER TREATMENT

(71) Applicant: ConocoPhillips Company, Houston, TX (US)

(72) Inventors: Lee D. Osness, Houston, TX (US); Kevin Lucas, Houston, TX (US); Paul Sameshima, Houston, TX (US); Jason C. Grundler, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 346 days.

(21) Appl. No.: 16/135,409

(22) Filed: Sep. 19, 2018

(65) Prior Publication Data
US 2019/0084848 A1    Mar. 21, 2019

Related U.S. Application Data

(60) Provisional application No. 62/560,453, filed on Sep. 19, 2017.

(51) Int. Cl.
| | | |
|---|---|---|
| *C02F 1/56* | (2006.01) | |
| *C02F 9/00* | (2006.01) | |
| *C02F 1/42* | (2006.01) | |
| *C02F 101/32* | (2006.01) | |
| *C02F 101/10* | (2006.01) | |
| *C02F 103/10* | (2006.01) | |
| *C02F 5/06* | (2006.01) | |
| *C02F 1/00* | (2006.01) | |
| *C02F 5/02* | (2006.01) | |

(52) U.S. Cl.
CPC ............ *C02F 1/56* (2013.01); *C02F 9/00* (2013.01); *C02F 1/004* (2013.01); *C02F 1/42* (2013.01); *C02F 5/025* (2013.01); *C02F 5/06* (2013.01); *C02F 2001/007* (2013.01); *C02F 2001/425* (2013.01); *C02F 2101/10* (2013.01); *C02F 2101/32* (2013.01); *C02F 2103/10* (2013.01)

(58) Field of Classification Search
CPC ......................................................... C02F 1/56
See application file for complete search history.

(56) References Cited

U.S. PATENT DOCUMENTS

| | | | |
|---|---|---|---|
| 2005/0194323 A1* | 9/2005 | Ruth ............... | B01D 17/0208 210/723 |
| 2011/0147306 A1 | 6/2011 | Polizzotti et al. | |
| 2014/0166586 A1 | 6/2014 | Sikes | |
| 2014/0374103 A1 | 12/2014 | Seth et al. | |
| 2014/0374104 A1 | 12/2014 | Seth | |
| 2015/0013987 A1 | 1/2015 | Underwood et al. | |

* cited by examiner

*Primary Examiner* — Peter Keyworth
(74) *Attorney, Agent, or Firm* — Boulware & Valoir

(57) ABSTRACT

Described herein is a coagulant blend for use in SAGD water treatment systems. Specifically, a blend of high charge density polyamine and low charge density poly(diallylmethyl ammonium chloride (poly-DADMAC) is used in the warm lime softening treatment process to coagulate and flocculate solids.

8 Claims, 3 Drawing Sheets

COAGULANT BLEND IN SAGD WATER TREATMENT

PRIOR RELATED APPLICATIONS

This invention claims priority to U.S. Ser. No. 62/560,453, filed on Sep. 19, 2017 and incorporated by reference in its entirety herein for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates to SAGD operations, specifically to improvements for the treatment of water used in SAGD.

BACKGROUND OF THE DISCLOSURE

Many countries in the world have large deposits of oil sands, including the United States, Russia, and various countries in the Middle East. However, the world's largest deposits occur in Canada and Venezuela. Oil sands are a type of unconventional petroleum deposit. The sands contain naturally occurring mixtures of sand, clay, water, and a dense and extremely viscous form of petroleum technically referred to as "bitumen," but which may also be called heavy oil or tar.

Bitumen is a thick, sticky form of crude oil, so heavy and viscous (thick) that it will not flow unless heated or diluted with lighter hydrocarbons. The crude bitumen contained in the Canadian oil sands is described as existing in the semi-solid or solid phase in natural deposits. Often times, it can be in excess of 1,000,000 cP. Regardless of the actual viscosity, bitumen in a reservoir does not flow without being stimulated by methods such as the addition of solvent and/or heat. At room temperature, it is much like cold molasses.

Due to their high viscosity, these heavy oils are hard to mobilize, and they generally must be made to flow in order to produce and transport them. One common way to heat bitumen is by injecting steam into the reservoir. The steam can be injected in a steam drive process, such as cyclic steam stimulation, or in a gravity assisted process, such as SAGD. These steam-based processes can also be combined with other methods, such as in situ combustion, solvent injection, gas injection, and the like.

SAGD or "Steam Assisted Gravity Drainage" is the most extensively used technique for in situ recovery of bitumen resources in the McMurray Formation in the Alberta Oil Sands and other reservoirs containing viscous hydrocarbons. In a typical SAGD process, two horizontal wells are vertically spaced by 4 to less than 10 meters. The production well is located near the bottom of the pay and the steam injection well is located directly above and parallel to the production well. In SAGD, steam is injected continuously into the injection well, where it rises in the reservoir and forms a steam chamber.

With continuous steam injection, the steam chamber will continue to grow upward and laterally into the surrounding formation. At the interface between the steam chamber and cold oil, steam condenses and heat is transferred to the surrounding oil. This heated oil becomes mobile and drains, together with the condensed water from the steam, into the production well due to gravity segregation within the steam vapor and heated bitumen and steam condensate chamber. This mixture of oil and condensed water in the lower production well is then pumped to the surface for additional separation.

Typically, the additional separation steps are performed off site and the recycled water is referred to as "produced water". Recovery and reuse of the water are needed to reduce operational costs and to minimize environmental concerns. As such, all water must undergo additional purification before it can be reused as steam.

Produced water contains contaminants such as dissolved silica, salts, and residual hydrocarbons. As SAGD is extremely water intensive, proper treatment is essential to eliminate corrosion and scale build-up from the water. If left untreated, the water quality is significantly reduced, leading to inefficient SAGD operations, and the lower quality water also leads to costly piping failures and downtime. Thus, the produced water undergoes a Warm Lime Softening (WLS) treatment to precipitate various contaminants for removal.

The concept of lime softening is to remove "hardness-causing" ions, e.g. calcium and magnesium, by converting them to particles that can be removed by sedimentation, filtration, and the like. Thus, lime softening water treatments consists of three separate sections: reaction (which converts hardness ions to a low solubility salts), precipitation (which happens after oversaturation of water with low soluble salts), and the sedimentation of generated particles. The ion exchange further removes ions and demineralizes the water. WLS systems operate at about 60-85° C., which reduces the solubilities of the calcium and magnesium, allowing for easier removal.

One of the key chemicals added to the WLS removes the hydrocarbons and small particulates. The preferred chemical is a polymeric, polycationic coagulant to disrupt the anionic dispersion and to thus promote coalescence of the oily droplets and solids into small particulates. Unfortunately, coagulants are costly chemicals, with most SAGD fields spending millions every year on these chemicals.

As oil production for a field can span decades, much research has been performed to lower coagulant costs by using less expensive components. US20110147306 discloses a method for treating oily wastewater comprising adding to the wastewater a cationic coagulant and an acrylamide copolymer flocculant that can be mixed with a cheap starch source such as corn or wheat starch.

US20140166586 discloses the use of a blend of lysine-based polymers that are biodegradable and environmentally benign and a polycationic coagulant selected from poly-DADMAC, poly(epi-DMA), and combinations thereof. The coagulants were then combined with a flocculant. The biodegradable polymers decreased the costs of disposing of some of the coagulants.

However, in addition to being cheaper, the replacement coagulants must also maintain the necessary water quality for SAGD without increasing boiler fouling. Further improvements to coagulants are needed because roughly three barrels of oily and bituminous containing process water are produced per barrel of recovered oil. Recovery and reuse of the water are needed to reduce operational costs and to minimize environmental concerns.

Thus, what are needed in the art are cheaper coagulants that improve water quality and reduce operational costs. Because there are economic and environmental incentives for improving efficiencies in steam generation in the bitumen and heavy oil industry and maintaining a closed-loop system, even incremental improvements in the oil field water treatment system can mean the difference between cost effective production and reserves that are uneconomical to produce.

SUMMARY OF THE DISCLOSURE

Disclosed is a composition for improved water treatment and methods of use. In particular, the composition is a blend of cost-efficient coagulants for treatment of water for SAGD operations. The blend comprises a mixture of a polyamine, such as epichlorhydrin-dimethylamine (epi-DMA), and poly (diallylmethyl ammonium chloride) (poly-DADMAC) coagulant for use in the warm lime softener (WLS) process in SAGD water treatment operations. Other water treatment steps, such as ion exchange, filtering, deaeration, and the like remain the same. Methods of treating SAGD water are also disclosed.

In more detail, the polyamine coagulant is a relatively low molecular weight, cationic polymer with a high charge density. The high charge density is used to neutralize the surface charge of lime sludge particles so that they can collide, agglomerate, and settle. An exemplary polyamine having these characteristics is epi-DMA. There are many commercially available polyamines that meet the requirements for the disclosed blend and some exemplary polyamines include the Ultrafloc series from Geo Specialty Chem, Accepta 4559 from Accepta, and KemSep 9000 Series from Kemira. Nalco Champion also offers a line of acceptable polyamine coagulants, such as Nalcolyte 8105.

The poly-DADMAC used in the present composition, however, has approximately a 10 times higher molecular weight than the chosen polyamine and a lower charge density as it is used to increase the settling rate of the lime sludge particles through a sweep mechanism. There are many commercially available poly-DADMACs that meet the charge and weight requirements for the disclosed blend from companies such as Kemira and Nalco Champion, including Cat-floc 8108 plus and Ultimer VX11402.

Together, the blended coagulant composition is able to improve sludge bed stability in the water treatment units while maintaining or improving the outgoing water quality.

The optimal ratio of the polyamine and poly-DADMAC in the blend will depend on the specific content on the water being treated, along with the mixing conditions in the specific warm lime softener. Applicants have found that the preferred ratio in its trials was roughly 70-90% poly-DADMAC by volume, with the remainder being epi-DMA, used as the polyamine. For these trials, this is approximately 50 ppm of poly-DADMAC and approximately 10-20 ppm of epi-DMA. This particular blend reduced coagulant costs by at least 40%, while providing optimal bed stability and significantly improved water quality over the 100% epi-DMA polymer typically used in SAGD water treatment.

This novel blend of coagulants vastly improved water quality performance, with such benefits including:
Improved WLS sludge bed stability and WLS effluent quality.
Reduced backwash and regeneration frequencies of the After Filters and WACs, respectively.
Improved BFW quality.
Improvement in OTSG boiler tube fouling.

During use, the disclosed blend is fed as a single stream into the warm lime softening treatment vessels at the normal coagulant injection point. However, depending on the chosen polymers and blend ratio, the viscosity can be higher than normally expected in SAGD operations. Thus, pumps with higher viscosity limits are needed, or retrofitted valves may be needed if incorporating the presently disclosed blend into working SAGD treatment systems. An exemplary injection pumps capable of handling large viscosity ranges include ProMinent Orlita DR series pumps, which operate over a 100 cP to 1 million cP range. However, many other pumps capable of handling the large viscosity ranges are commercially available.

The WLS process operates best under steady state conditions (flow, temperature, pH, chemical feed). One with skill in the art can determine the appropriate conditions based on the water being treated and the composition of the coagulant blend to set the feed rate, WLS operation temperature, and/or mixing rate. Further, this novel coagulant blend can be used at any typical SAGD WLS that operates at a pH range from 9.0 to 10.5.

Typically, produced water and optional makeup water are the streams treated by the warm lime softening system. However, the coagulant blend can be used for any water undergoing warm lime softening. Produced SAGD water is often mixed with fresh water, saline water, recycled blowdown water from the steam generators, regeneration streams from various filters in the treatment system, and the like before being treated.

Further, the coagulant blend is not limited to a particular temperature range, thus it can be used for cold and hot lime softening processes, too. As such, the blend can find use in treating water for e.g. industrial water and/or wastewater treatment facility, especially for refining and petrochemical applications, not just SAGD water.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, "SAGD water" refers to all water used or accumulated in the SAGD operation and includes produced water, fresh water, brackish water, blowdown streams from generators, regeneration streams from e.g. filters in the treatment process, and saline.

As used herein, "blend" refers to a mix of one substance with another substance so that they combine together as a mass. In the present methods, the coagulants are combined in piping and then introduced into a water stream or are fed into the water treatment vessels as a single stream.

The term "untreated water" encompasses all water used for SAGD that has not undergone significant pretreatment to e.g., remove dissolved solids before being heated and includes sources such as feedwater, brackish water and water recovered from a production fluid. The untreated water can under an optional de-oiling step before being treated.

The term "produced water" is used herein to describe water that is produced as a byproduct along with oil and gas (i.e. water recovered from the production fluid). This water is often pretreated and mixed with other streams of water before re-use in steam generation or disposal.

A "warm lime softener process" treats water by adding heated limewater to reduce hardness and alkalinity, and magnesium oxide to reduce the silica content of the boiler feedwater. The water can then subsequently treated with a weak or strong acid cation exchange to further soften the water and filters to remove precipitated solids. The softener process is operated at around ~60-85° C.

As used herein, the term "warm lime softener unit" includes a solids-contact gravity clarifier for the warm lime softener reactions, and subsequent ion exchange and filter systems. Any filter or filter system or ion exchanger commonly used in SAGD water treatment can be used with the current invention. Ideally, the only change to a water treatment system is the addition of a mixing vessel for blending the coagulants and retrofitted valves to allow introduction of the coagulants into the warm lime softener unit at the coagulant inlet.

Preferably, the ion exchanger in the warm lime softener unit utilizes a weak acid cation. Weak acid cation ion exchangers derive their exchange activity from a carboxylic group (—COOH). Weak acid cation resins are used primarily for softening and dealkalization of high-hardness, high-alkalinity waters such as those encountered in SAGD operations. However, other ion exchange material can be utilized.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| BFW | boiler feedwater |
| poly-DADMAC | polydiallylmethyl ammonium chloride |
| SAGD | Steam Assisted Gravity Drainage |
| SAGD | Steam assisted gravity drainage |
| WAC | weak acid cation |
| WLS | Warm Lime Softener |
| ppm | Parts per million |
| ppmv | Parts per million by volume |
| epi-DMA | epichlorhydrin-dimethylamine |
| meq/g | milliequivalent/grams |

DESCRIPTION OF EMBODIMENTS OF THE DISCLOSURE

Figure 1:
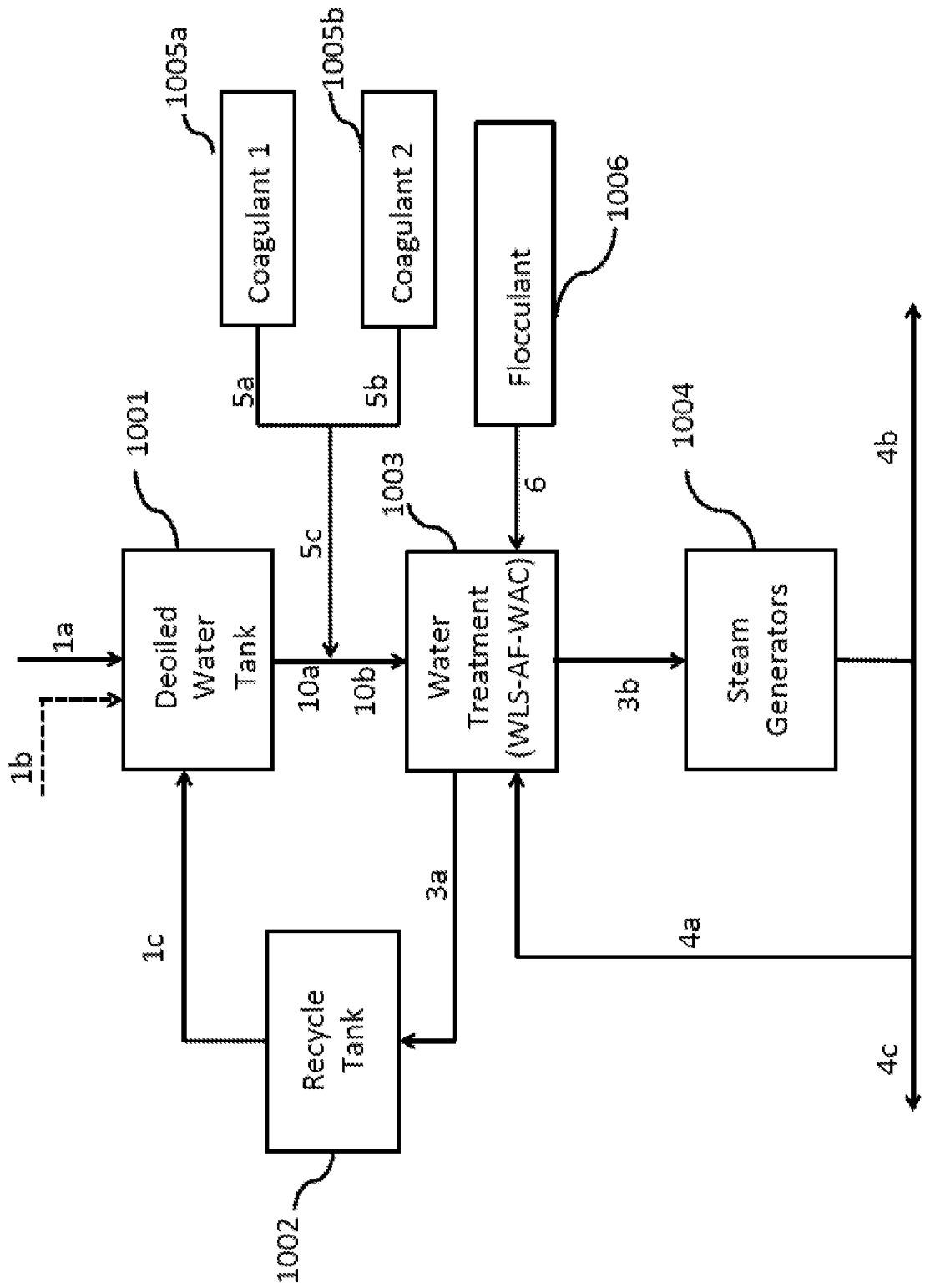
FIG. 1. Simplified schematic of a water treatment operation for SAGD according to one embodiment.

The invention provides a novel coagulant blend for use in SAGD water treatment operations and methods of treating water. In addition to being a cheaper option, the blend improves the quality of the sludge bed in the treatment system, which leads to improvements in the quality of the treated water quality and reductions in fouling of the steam generators.

The present methods includes any of the following embodiments in any combination(s) of one or more thereof:

A coagulant composition for warm lime softener treatments comprising a blend of a high charge density polyamine and a low charge density poly(diallylmethyl ammonium chloride) (poly-DADMAC).

Preferably, the high charge density is at least 2.5 meq/g and higher, most preferably at least 4 meq/g, whereas the low charge density is preferably less than 1 meq/g, most preferably less than 0.5 meq/g.

A method for treating water, comprising the steps of obtaining water from an underground hydrocarbon-containing formation during SAGD oil recovery performed on said underground formation, wherein said water contains hardness, and optionally de-oiling the water; combining a high charge density polyamine and a low charge density poly(diallylmethyl ammonium chloride) (poly-DADMAC) to form a coagulant; injecting the water, coagulant, and a lime solution into a solids-contact gravity clarifier; performing a warm lime softening reaction in the solids-contact gravity clarifier to treat the water and to form precipitated solids; injecting a flocculant into the solids-contact gravity clarifier and flocculating the precipitated solids; filtering the precipitated solids to form a treated water; and, injecting the treated water into a boiler to make steam for SAGD oil recovery. The water can optionally be de-oiled prior to combination with the coagulants. The water can also optionally be treated with a weak acid cation exchanger after filtering the solids.

A method for treating produced water for SAGD operations, comprising mixing a produced water stream, which is optionally de-oiled, with an optional makeup water, an optional steam generator blowdown stream, and an optional a warm lime softener unit regeneration stream in a first vessel at a known and constant ratio to form a water mixture; combining a high charge density polyamine and a low charge density poly(diallylmethyl ammonium chloride) (poly-DADMAC) in a second vessel to form a coagulant; introducing the water mixture and the coagulant into a warm lime softener unit, the unit comprising a warm lime softener, an ion exchanger, and at least one filter all in fluid communication, wherein the warm lime softener unit has an outlet for a warm lime softener unit regeneration stream, an inlet for the water mixture and coagulant, and an inlet for softening chemicals, wherein the warm lime softener unit is fluidly connected to the first and second vessel; mixing the water mixture and the coagulant with the softening chemicals in said warm lime softener to form a softened mixture; treating the softened mixture with an ion exchanger and at least one filter to form a treated saline water stream; feeding the treated saline water stream into a steam generator. The generated steam can then be injected into a reservoir for hydrocarbon recovery operations, such as SAGD.

A coagulant composition for warm lime softener treatments comprising a blend of a high charge density epichlorhydrin-dimethylamine (epi-DMA) and a low charge density poly(diallylmethyl ammonium chloride) (poly-DADMAC), wherein the molecular weight of said poly-DADMAC is ten times the molecular weight of said epi-DMA, and said composition is 70-90% poly-DADMAC and 10-30% epi-DMA.

In any of the above, the produced water can be deoiled before being mixed with the coagulant.

In any of the above, the poly-DADMAC has a molecular weight that is 5-15 times larger than the molecular weight of polyamine. Preferably, 8-12, or 10 times larger.

Any of the above composition can have 70-90% poly-DADMAC by volume and 10-30% of polyamine by volume. Or, 50 ppmv of polyamine and 10-20 ppmv of poly-DADMAC. Or two-thirds poly-DADMAC and one-third polyamine.

In any of the above, the polyamine can be epichlorhydrin-dimethylamine (epi-DMA).

Produced water is different than typical wastewater in that it has dissolved organic compositions from petroleum in the water. These dissolved organics interfere with many water treatments processes and chemicals. SAGD produced water is especially difficult to deal with because the amount of dissolved organics is much greater than other produced water because of the steam and heated water interacting with bitumen during SAGD operations.

The standard coagulant for water treatment systems in the oil and gas industry has been a polyamine, particularly epiDMA. However, treatment of produced water, particularly SAGD produced water, with polyamine coagulants lead to unsatisfactory results. To reduce treatment costs and improve the quality of treated water, Applicant began testing different coagulants, including new poly-DADMACs, which coagulant target compounds through different mechanisms than polyamines such as epiDMA. These coagulants did not work, and in most applications, treated water quality decreased exponential. As such, Applicant began testing blends of polyamines and poly-DADMAC. The blends was not expected to work well as there would be negative interactions between the two coagulants due to their different coagulating mechanisms, including fouling of the treatment plant. However, Applicant found that this blend did work. This was unexpected because one component, poly-DADMAC, was known to be unsuccessful for treating oil and gas related water.

FIG. 1 displays an exemplary configuration of a water treatment operation used for SAGD operations for one embodiment of the presently disclosed blend. The operation comprises a deoiled water tank (1001), a WLS unit (1003), a recycle tank for mixing various recycled streams (1002), two coagulant tanks (1005a and 1005b), a flocculant tank (1006) and a steam generator (1004) for heating treated water.

In most SAGD operations, produced water and an optional makeup water are treated using warm lime softening (WLS). However, other water sources can also be treated in a WLS unit. As shown in FIG. 1, the AF and WAC Regeneration Streams (3a) from the WLS water treatment unit (1003) are all combined in a recycle tank (1002) to form a combined recycle stream (1c). The combined recycle stream (1c) can then be mixed with the produced water and optional makeup water in the de-oiled water tank (1001) before being sent to the WLS unit (1003). Optionally, the combined recycle stream (1c) can be injected directly into the WLS unit (1003), similar to the recycle blowdown (4a) from the steam generator (1004) in FIG. 1. Alternatively, the recycle blowdown (4a) stream from the steam generator (1004) can also be introduced into the recycle tank.

The combined recycle stream (1c) is then sent to the deoiled water tank (1001) for treatment. This recycled stream is optional for the deoiled water tank (1001) and may be treated by other treatment processes such as cold or hot lime softening or sent directly to the WLS unit (1003). In some embodiments, the produced water and an optional make up water using e.g. freshwater, is the only water being treated in the deoiled water tank (1001). In other embodiments, the produced water and other untreated water (brackish, saline, etc.) are treated using the disclosed coagulant blend. However, these streams were shown in FIG. 1 as an example of other types of water that can be treated using the presently disclosed coagulant blend.

The coagulants are stored in separate vessels (1005a,b) and their individual streams (5a,b) are combined into stream (5c), but not mixed. The combined stream (5c) is then injected into the piping connecting the deoiling water treatment unit and the warm lime softening unit.

In more detail, untreated, deoiled water (10a) is combined with the coagulants (5c), and is introduced into a warm lime softening unit for treatment (10b). Lime softening is preferably performed in a solids-contact gravity clarifier to optimize the efficiency of the lime softening reaction. Solids-contact clarifiers combine chemical mixing, coagulation, and clarification in a single vessel and use a high concentration of solids to form a bed or blanket of sludge. The WLS (1003) unit also contains a weak acid ion exchange process and filters for further softening of the water and separation of precipitated solids. A vessel containing flocculant (1006) is also attached to the WLS (1003) such that a stream of flocculant (6) can be added when needed in the softening process.

The coagulants (5a,b) are combined at a pre-determined ratio of polyamine to poly-DADMAC and injected into the untreated, deoiled water stream (10a). From there, the coagulant/untreated water stream (10b) is pumped into a solids-contact gravity clarifier in the WLS unit (1003) using the same injection location as the original untreated water stream. As shown here, fresh water (1b), produced water (1a) and recycled water (1c) are deoiled and combined with the coagulants in the WLS unit (1003), treated using warm lime softening and ion exchange mechanism before the treated stream (3b) is sent to the steam generator (1004) to generate steam for downhole operations (4b). As mentioned above, the recycle stream (4a) from the steam generator (1004) is sent to the recycle tank (1002). However, a small fraction (4c) of steam to be recycled is intentionally purged to avoid concentration of impurities during continuing evaporation of steam and is disposed of inside a deep well.

In other embodiments, the two coagulants can be blended together in a mixing vessel before being introduced to the deoiled water stream. Alternatively, the two blended coagulants can also be injected directly into the WLS unit for mixing with the untreated water stream. However, the simplest option is to combine the piping of the two streams to form the coagulant blend used in the WLS unit.

As mentioned above, the higher viscosity coagulants required some modifications to the system. Applicants found that changes to the pumping system and retrofitting valves were all that were needed to account for the changes in the coagulant's properties. However, it is possible that the pumping system in place is capable of handling higher viscosities and retrofitting valves is all that is needed to accommodate the blended coagulant. Once modified, the coagulant blend can be introduced into the warm lime softener unit and used to treat the untreated water (produced, recycled, fresh, and the like).

The present invention is exemplified with respect to the following examples for an Oil Sands reservoir already in operation. However, this is exemplary only, and the invention can be broadly applied to any SAGD reservoir or non-SAGD specific water treatment operations, either in place or being developed. The following examples are intended to be illustrative only, and not unduly limit the scope of the appended claims.

Optimizing Coagulent Blend

Oil Sands 1 is a SAGD bitumen recovery facility, and a multi-decade commercial production project using SAGD recovery began in 2007. The incumbent coagulant used in the WLS reaction mix zone was a commercially available epi-DMA polyamine. The polyamine is typically the most expensive chemical added in the water treatment plant and one of the most expensive chemicals in the entire facility. The incumbent, commercially available epi-DMA polyamine had a low molecular weight, high charge density cationic polyamine coagulant designed to neutralize the surface charge of lime sludge particles so they can collide, agglomerate and settle.

In addition to being costly, use of the incumbent epi-DMA polyamine was problematic. For example, establishing an optimum dosage was challenging. In order to determine coagulant dosage, WLS effluent water quality parameters such as effluent turbidity and particulate hardness were used in conjunction with other tools such as a zeta potential analyzer and jar tests. There are numerous factors that can impact WLS effluent turbidity in addition to coagulant dosage, such as WLS temperature, flow, pH and water composition. Thus, changes to the commercially available epi-DMA polyamine dosage based on WLS effluent turbidity were not an efficient approach. Further, improvements to boiler feedwater (BFW) and WLS sludge bed stability were desired. As such, this system was chosen to implement the disclosed coagulant system.

As disclosed above, the novel coagulant composition was a combination of a commercially available polyamine, here epi-DMA, and a commercially available poly-DADMAC coagulant. A trial was performed at Oil Sands 1 to find the best ratio blend of the chosen epi-DMA and poly-DADMAC with the understanding that a successful alternate coagulant trial could reduce the Oil Sand 1's WTP chemical OPEX by approximately $ 1 MM/year.

The proposed poly-DADMAC coagulant for the proof of concept experiments was a commercially available poly-DADMAC with a high molecular weight, low charge density cationic coagulant designed to increase the settling rate of lime sludge particulate. The selected poly-DADMAC does not function by neutralizing particulate surface charge like the incumbent polyamine, but does increase the settling rate through a sweep mechanism wherein larger particles settling at a faster velocity than smaller particles sweep some of the smaller particles from the suspension.

For comparison, the molecular weight of poly-DADMAC was about 10× greater than the molecular weight of commercially available epi-DMA polyamine. As such, the optimum dosage for selected poly-DADMAC was experimentally determined by monitoring the settling rate in the WLS rapid and slow mix zones.

Table 1 displays a comparison of the viscosity of each coagulant at various temperatures that may be used during the WLS process. Their difference in viscosity over the range of possible WLS operation temperatures necessitated a change in pumping equipment at Oil Sands 1. Ultimately, ProMinent Orlita DR series pumps were installed as they handled viscosity ranges from 100 cp to 1 million cp, which covered the ranges for both the incumbent and alternate coagulants.

TABLE 1

Coagulant Viscosity Comparison

| | | Coagulant Viscosity (cP) | |
|---|---|---|---|
| Coagulant Temperature | | Incumbent Commercially available epi-DMA polyamine | Alternate Commercially available poly-DADMAC |
| Min | 10° C. | 200 | 700 |
| Norm | 20° C. | 125 | 550 |
| Max | 35° C. | 100 | 480 |

Once the Oil Sands 1 water treatment system was configured to allow for mixing and pumping of the chosen coagulant blend into the WLS, preferred ratios and other parameters of the proposed polyamine/poly-DADMAC blend were determined through a series of trials.

Prior to trial initiation, the sludge bed height in the solids-contact gravity clarifier was purposely increased from 2.4 meters (normal operating condition) to 2.7 meters because the poly-DADMAC coagulant was expected to increase the settling rate. Increasing the sludge bed to 2.7 meters provides additional time to respond to changes in the WLS performance during the coagulant transition phase.

To find the best mixture of the two coagulants, the current WLS unit was first switched to a pure poly-DADMAC system and then optimized by small additions (~10% maximum) of the original epi-DMA over a period of time. Operations were gradually transitioned from the commercially available epi-DMA polyamine to the poly-DADMAC according to the transition program shown in Table 2.

WLS sludge bed characteristics and effluent water quality were closely monitored and changes to turbine speed, sludge wasting and sludge recirculation were made as the coagulant transitioned to the poly-DADMAC. Once the system was completely moved to poly-DADMAC, a noticeable drop in performance of the system was determined. This was expected based on Applicant's previous tests of various coagulants. The commercially available epi-DMA polyamine was slowly added back and the water quality was monitored for improvements.

TABLE 2

Coagulant Transition Program

| Day | Time | Commercially available epi-DMA polyamine (ppm) | Commercially available poly-DADMAC (ppm) |
|---|---|---|---|
| Initial | n/a | 90 | 0 |
| 0 | ~7:00 am | 75 | 10 |
| 1 | ~7:00 am | 50 | 20 |
| 2 | ~7:00 am | 25 | 30 |
| 3 | ~7:00 am | 0 | 40 |

After slowly adding the commercially available epi-DMA polyamine, Applicant found that a blend of 40 ppm per coagulant improved water quality and stabilized the bed. This blend maintained a nice sludge bed height and characteristics. Further, the water quality obtained when using this blend was exceptional. This improved water quality was first seen during the initial transition period from polyamine to 100% poly-DADMAC and then replicated when commercially available epi-DMA polyamine was reintroduced to the system during the period of WLS instability.

Figure 2A:
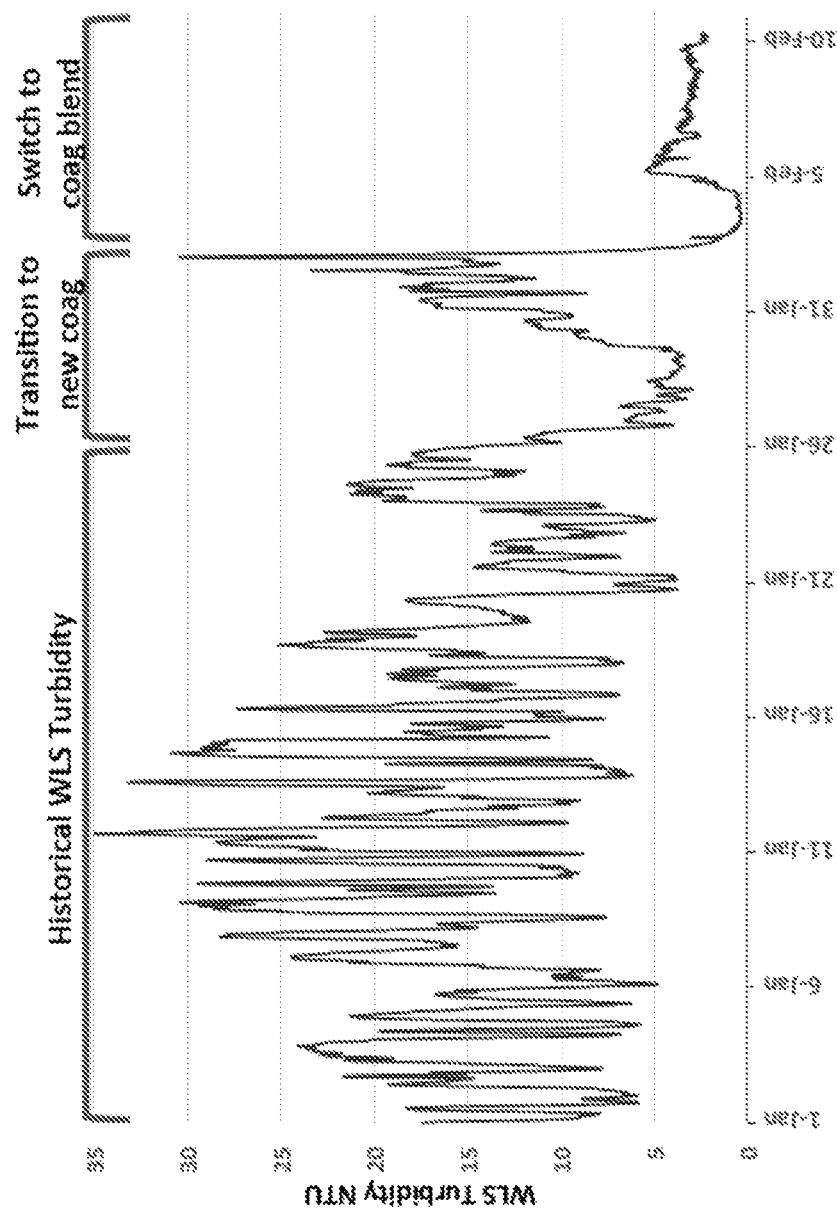
FIG. 2A displays the improvement in the WLS outlet turbidity using an optimized blend of coagulants.
Figure 2B:
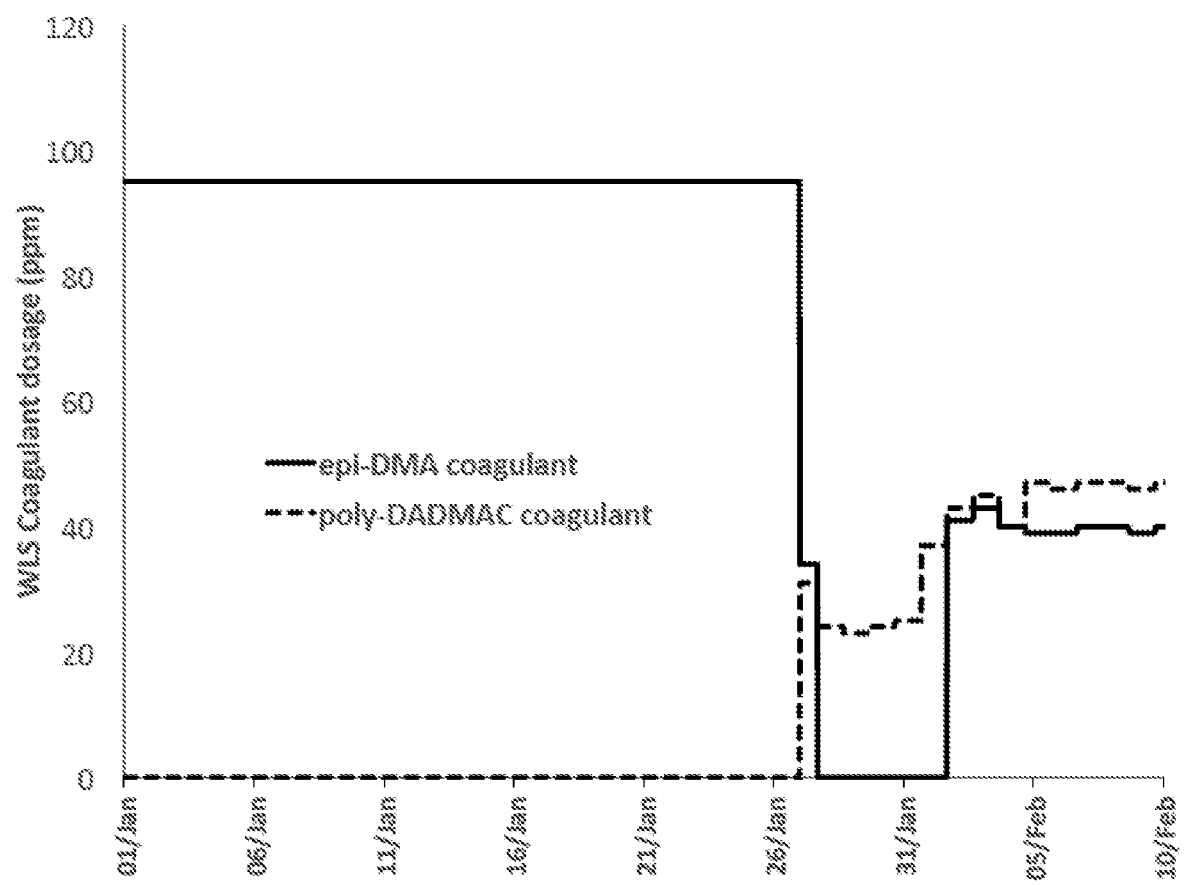
FIG. 2B displays a single trend that shows the dosage changes of the epi-DMA and the DADMAC coagulants over the time period when the polyamine is first transitioned.

FIGS. 2A-B display the changes in key performance indicators and key operating parameters during the reintroduction of the commercially available epi-DMA polyamine. FIG. 2A shows the dramatic improvement in the WLS outlet turbidity with the blend of coagulants. The turbidity remained low (single digits) and the sludge bed was stable at 2.4 meters. FIG. 2B displays a single trend that shows the dosage changes of the epi-DMA and the poly-DADMAC coagulants over the time period when the polyamine is first transitioned.

All key water quality parameters (turbidity, dissolved hardness and total hardness) were at levels not previously maintained in the Oil Sands 1 water plant before this trial. Given the water quality results, the potential exists that the benefits of this improved water quality could outweigh cost savings from a full transition to the poly-DADMAC and this benefit would be driven by reduced OTSG fouling and increased pigging intervals.

Small adjustments to the rate of blend feed can be made based on estimated coagulant need, bed conditions and other factors; however, the drive to maintain a coagulant blend should be maintained.

After the coagulant ratio is set, the remaining steps in the treatment process can proceed. Typically, coagulants are followed by injections of flocculants. The softened water then undergoes an ion exchange process before the precipitated solids are filtered using an after filter (AF). While these treatment steps are not affected by the choice of coagulants, Applicant did see some effects on the chemicals needed for the remaining treatment steps, particularly in the flocculant.

Effect on Flocculant

A side benefit of the present coagulant blend was a slight reduction in the amount of required flocculants. The optimal flocculant dosage was reduced from 3.5 ppm to 1.5 ppm, a reduction of over 50%.

Applicant conducted another trial using a different commercially available poly-DADMAC, to study the effect on the flocculants. As before, the system was slowly switched to 100% poly-DADMAC and the commercially available epi-DMA polyamine was reintroduced.

For both blends tested, the water quality of the exiting or effluent stream was much improved. This had a significantly positive impact on the steam production, as it was more reliable and less costly when compared to polyamine or poly-DADMAC alone.

Thus, the novel blend of polyamine and poly-DADMAC improved water quality and sludge bed conditions over that experienced with either polyamine or poly-DADMAC alone.

The following references are incorporated by reference in their entirety
US20110147306
US20140166586

The invention claimed is:

1. A method for treating water, comprising the steps of:
 a) obtaining water from an underground hydrocarbon-containing formation during SAGD oil recovery performed on said underground formation, wherein said water contains hardness, and optionally de-oiling said water;
 b) combining a high charge density polyamine and a low charge density poly(diallylmethyl ammonium chloride) (poly-DADMAC) to form a coagulant, wherein said low charge density is less than 1 meq/g and said high charge density is about or greater than 2.5 meq/g;
 c) injecting said water, coagulant, and a lime solution into a solids-contact gravity clarifier;
 d) performing a warm lime softening reaction in said solids-contact gravity clarifier to treat said water and to form precipitated solids;
 e) injecting a flocculant into said solids-contact gravity clarifier and flocculating said precipitated solids;
 f) filtering said precipitated solids to form a treated water; and,
 g) injecting said treated water into a boiler to make steam for said SAGD oil recovery.

2. The method of claim 1, step f) further comprising the step of treating said water with a weak acid cation exchanger.

3. The method of claim 1, wherein said poly-DADMAC has a molecular weight that is ten times the molecular weight of said polyamine.

4. The method of claim 1, said coagulant comprising two-thirds poly-DADMAC and one-third polyamine.

5. The method of claim 1, wherein said injection step c) comprises injecting 50 ppm of said poly-DADMAC and 10-20 ppm of said polyamine.

6. A method for treating produced water for SAGD operations, comprising:
 a) mixing a produced water stream with an optional makeup water, an optional steam generator blowdown stream, and an optional a warm lime softener unit regeneration stream in a first vessel at a known and constant ratio to form a water mixture;
 b) combining a high charge density polyamine and a low charge density poly(diallylmethyl ammonium chloride) (poly-DADMAC) in a second vessel to form a coagulant, wherein said low charge density is less than 1 meq/g and said high charge density is about or greater than 2.5 meq/g;
 c) introducing said water mixture and said coagulant into a warm lime softener unit, said unit comprising a warm lime softener, an ion exchanger, and at least one filter in fluid communication, wherein said warm lime softener unit has an outlet for a warm lime softener unit regeneration stream, an inlet for said water mixture and coagulant, and an inlet for softening chemicals, wherein said warm lime softener unit is fluidly connected to said first and second vessel;
 d) mixing said water mixture and said coagulant with said softening chemicals in said warm lime softener to form a softened mixture;
 e) treating the softened mixture with an ion exchanger and at least one filter to form a treated saline water stream; and,
 f) feeding said treated saline water stream into a steam generator.

7. The method of claim 6, wherein said poly-DADMAC has a molecular weight that is ten times the molecular weight of said polyamine.

8. The method of claim 6, said softened mixture comprises about 50 ppm of said poly-DADMAC and about 10-20 ppm of said polyamine.

* * * * *